United States Patent [19]
Edstrom, Sr. et al.

[11] Patent Number: 5,501,177
[45] Date of Patent: Mar. 26, 1996

[54] ANIMAL WATERING VALVE

[75] Inventors: William E. Edstrom, Sr., Waterford; George J. Grkavac, Milwaukee, both of Wis.

[73] Assignee: Edstrom Industries, Inc., Waterford, Wis.

[21] Appl. No.: 294,738

[22] Filed: Aug. 23, 1994

[51] Int. Cl.$^6$ ............................................. A01K 7/06
[52] U.S. Cl. .......................................... 119/72.5; 251/339
[58] Field of Search ................... 119/72.5, 18; 251/339; 137/614.12

[56] References Cited

U.S. PATENT DOCUMENTS

| | | |
|---|---|---|
| 2,710,594 | 6/1955 | Thompson ........................ 119/72.5 |
| 2,939,424 | 6/1960 | Frederiksen ..................... 119/72.5 |
| 3,228,377 | 1/1966 | Grassano ........................ 119/72.5 |
| 3,256,917 | 6/1966 | Baumann et al. ................. 141/295 |
| 3,550,560 | 12/1970 | Edstrom ......................... 119/72.5 |
| 4,006,716 | 2/1977 | Cross ............................ 119/72.5 |
| 4,187,804 | 2/1980 | von Taschitzki ................. 119/72.5 |
| 4,258,666 | 3/1981 | Edstrom ......................... 119/72.5 |
| 4,370,948 | 2/1983 | Atkins .......................... 119/72.5 |
| 4,391,225 | 7/1983 | Sparks .......................... 119/72.5 |
| 4,403,570 | 9/1983 | Freehafer ....................... 119/72.5 |
| 4,406,253 | 9/1983 | Atchley et al. ................. 119/72.5 |
| 5,065,700 | 11/1991 | Cross ........................... 119/72.5 |
| 5,074,250 | 12/1991 | Clark, IV ....................... 119/72.5 |
| 5,329,877 | 7/1994 | Schumacher ...................... 119/72.5 |

*Primary Examiner*—Robert P. Swiatek
*Assistant Examiner*—Yvonne Abbott
*Attorney, Agent, or Firm*—Nilles & Nilles

[57] ABSTRACT

An animal watering valve has a diaphragm and a domed valve stem head which provide improved control of the forces applied to the domed valve stem head and which interact to reduce the actuating forces necessary to open the valve by increasing the mechanical advantage of the valve stem/diaphragm combination. The diaphragm and valve stem also interact with each other and with an associated elastomeric ring to provide improved centering of the valve stem on the diaphragm and to permit flow rates through the valve to be adjusted without adversely affecting valve operation. An elastomeric cup shaped shield may also be employed and, if provided, imparts reduced resistance to valve stem deflection and inhibits accumulation of fluid in areas which may be contaminated.

23 Claims, 8 Drawing Sheets

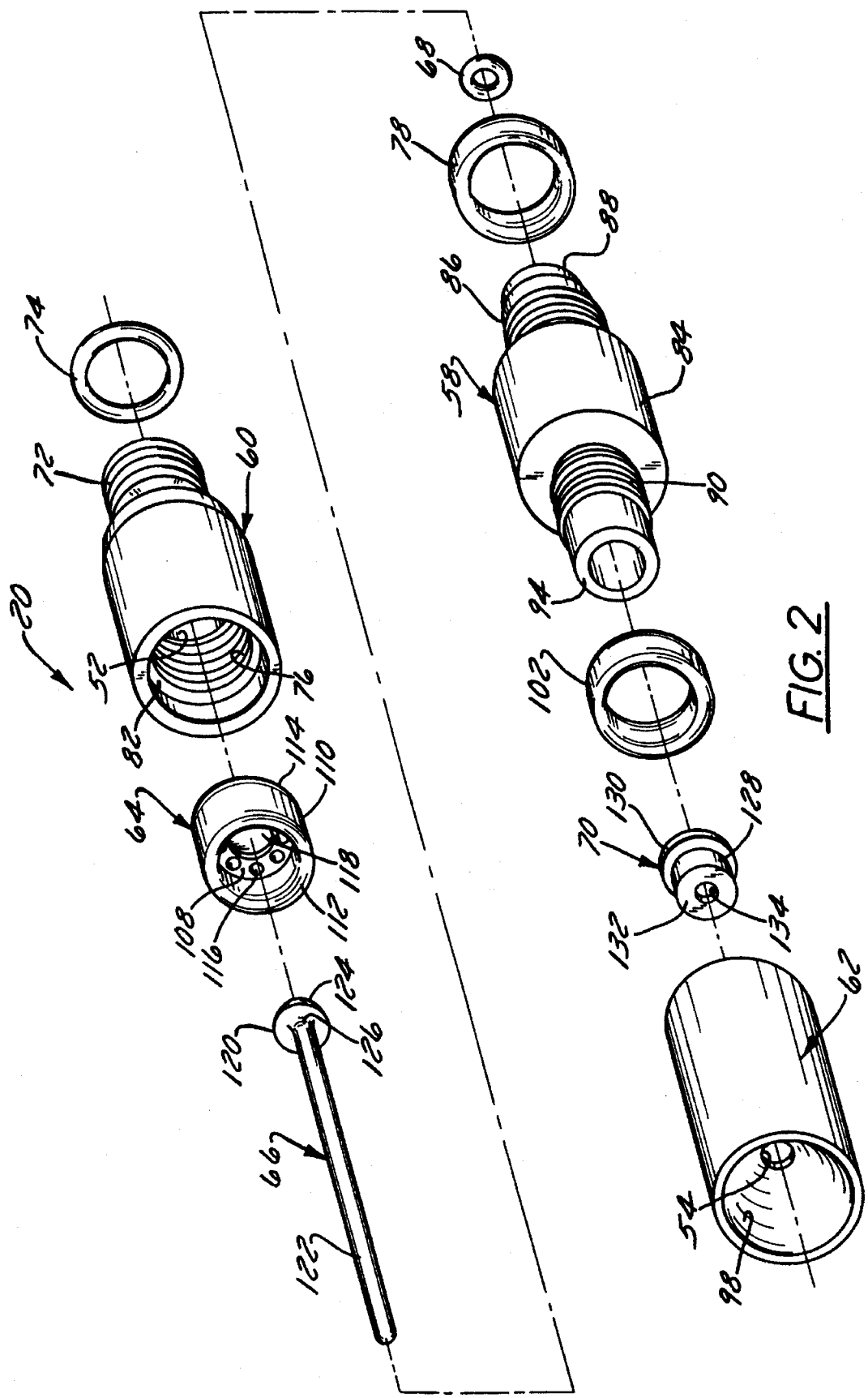

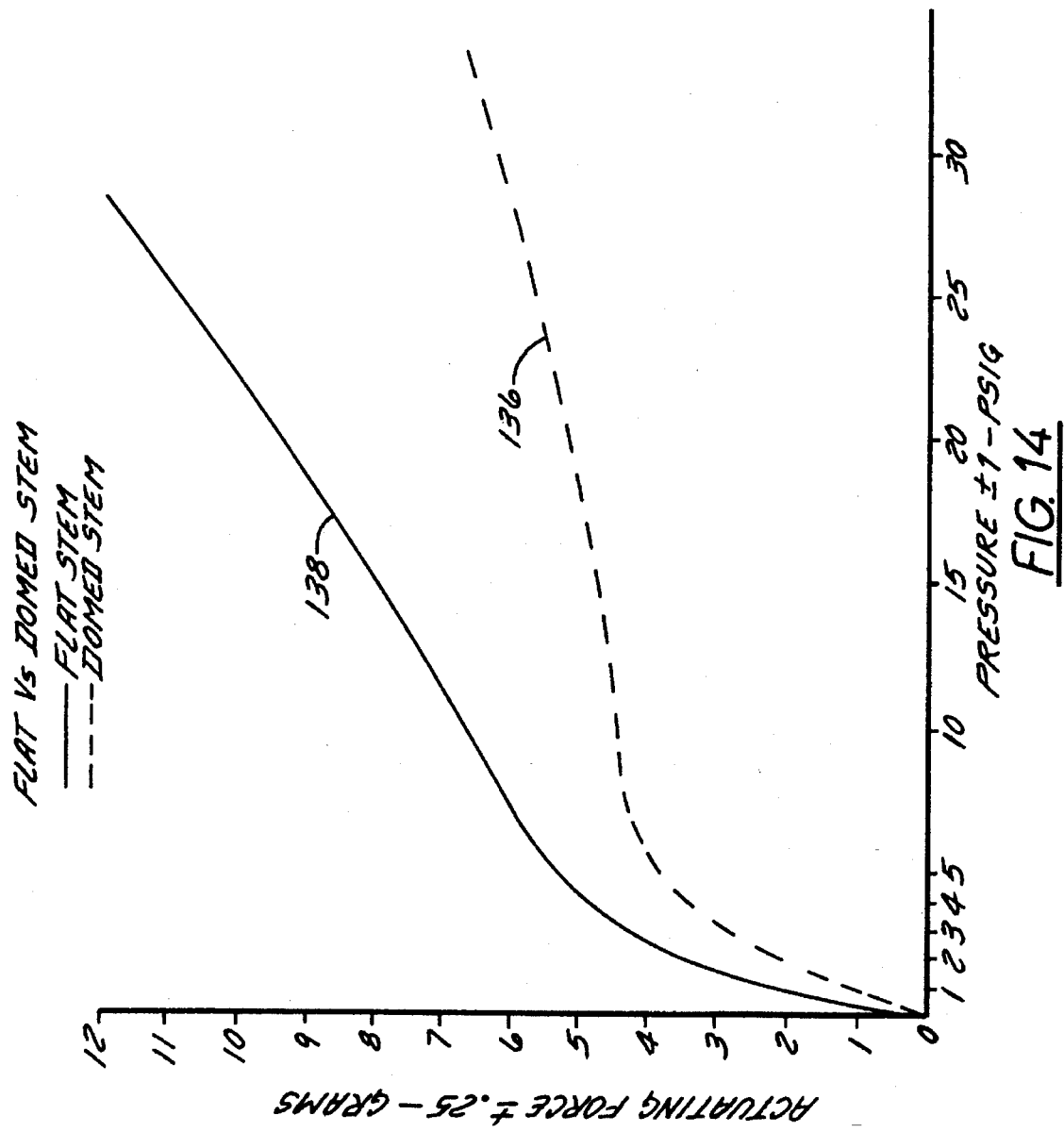

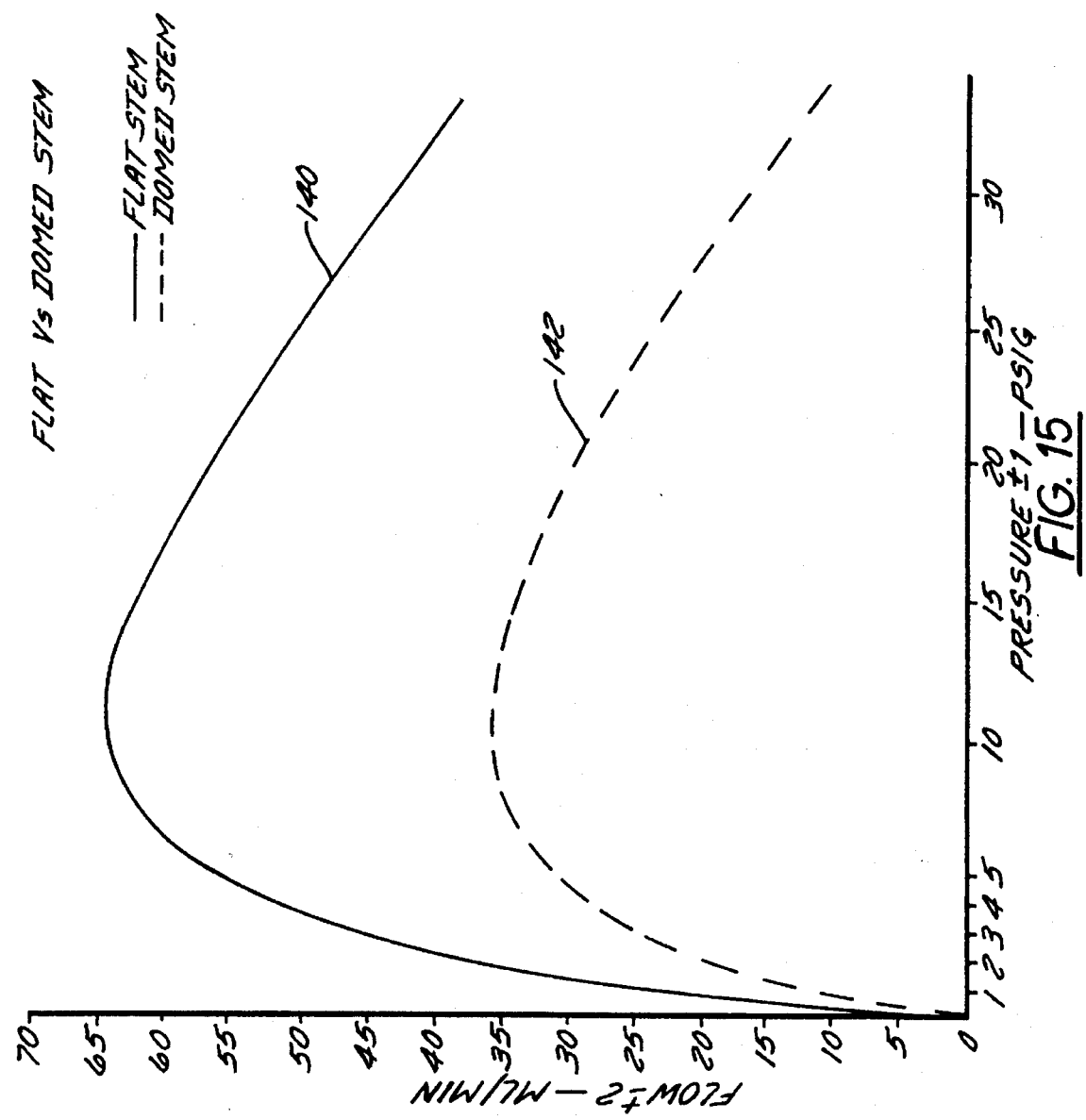

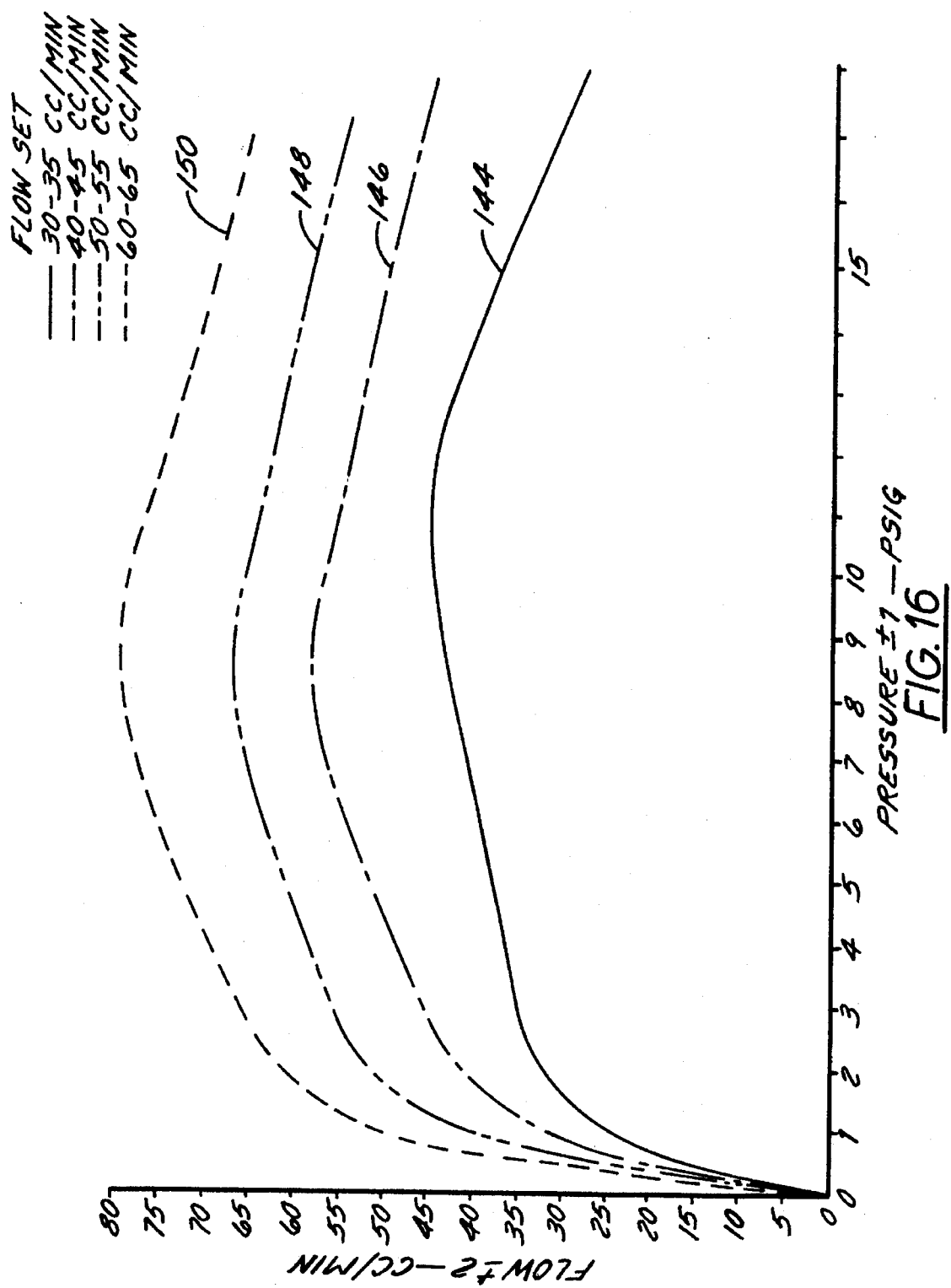

ANIMAL WATERING VALVE

BACKGROUND OF THE INVENTION

1. Field of the Invention

The invention relates to animal watering valves and, more particularly, relates to animal actuated valves for use by mice, ram, and other relatively small laboratory animals or commercially raised animals.

2. Discussion of the Related Art

Animal actuated watering valves are well known. One such valve is disclosed in U.S. Pat. No. 5,065,700 which issued to Cross on Nov. 19, 1991 (the Cross patent). The valve disclosed in the Cross patent employs a housing having an inlet and an outlet connected by an elongated longitudinal bore, a valve element located adjacent the inlet, and an elongated actuating lever or valve stem which extends through the bore, which projects out of the outlet, and which; when deflected by an animal, opens the valve element to permit the passage of fluid through the valve housing. A movable shield or shutter member is provided adjacent the outlet to inhibit the animal from stuffing bedding material or other debris into the outlet and thus inhibits the valve from being unintentionally lodged in its open position.

The watering valve disclosed by the Cross patent suffers from several drawbacks and disadvantages. For instance, neither the shield nor the valve element applies sufficient biasing forces to the valve stem to return the valve stem to its position of rest. A return member in the form of a helical spring must therefore be provided to close the valve when the animal releases the stem. This spring unduly increases the complexity of the valve and is itself subject to corrosion and breakage which could render the valve inoperable. Moreover, the configuration of the helical spring and its relationship to the remainder of the valve prevents adjustment of the valve for varying flow rates.

In addition, the shutter or shield is rigid and thus must move with the stem or actuating lever to permit valve opening. This shield is thus subject to corrosion and jamming which may inhibit or even prevent valve opening or which may cause the valve to stick in its open position.

Some of the problems associated with the valve disclosed by the Cross patent can be alleviated by employing a valve in which the return forces for the valve stem are supplied by an elastomeric diaphragm rather than a return spring. For instance, U.S. Pat. No. 4,258,666 to Edstrom (the Edstrom patent) discloses a valve employing a housing which includes a valve cap in a valve seat and which has an inlet and an outlet connected by an elongated longitudinal bore. An elongated stem extends downstream through the bore from the valve seat, and an elastomeric diaphragm is clamped between the valve cap and the valve seat and acts as a return element for the valve stem. A cone rests upon an upstream surface of the diaphragm and is independently movable relative to the diaphragm. The thus configured valve is operable, upon deflection of a tail of the valve stem by an animal, to permit fluid to flow through the valve at a rate determined by the thickness of a gap formed between the cone and an adjacent surface of the valve cap. This flow rate can be adjusted by adjusting the axial position of the valve cap on the valve seat, thereby adjusting the amount of bulge of the diaphragm on which the cone rests and thus adjusting the position of the cone relative to the valve cap. The diaphragm and associated elements provide sufficient return forces to the valve stem to obviate the need for a separate helical compression spring of the type employed by the device disclosed in the Cross patent.

The Edstrom patent, though eliminating some of the problems associated with the Cross patent, suffers from drawbacks and disadvantages. For instance, the central web portion of the diaphragm is bulged or distorted prior to use and thus cannot be stretched freely. The closing forces of this diaphragm are thus difficult to control. Moreover, the head of the valve stem is flat and thus requires relatively high actuating forces because a mechanical advantage L/W (where L is the length of the valve stem and W is the width of the effective line of contact between the head of the valve stem and the seat) is relatively small because W is relatively large. Finally, the relationship between the diaphragm and the head of the valve stem do not adequately assure centering of the valve stem on the diaphragm. This is important because, if the stem is not centered on the diaphragm, the stroke of the stem will vary depending upon the direction of stem actuation, thus varying the rate of fluid flow through the valve.

Still another animal watering valve is disclosed in copending application Ser. No. 08/075,223 to Edstrom et al. (the Edstrom et al. application) Now U. S. Pat. No. 5,337,696. The valve disclosed in the Edstrom et al. application also employs a diaphragm and a valve stem, and additionally employs mechanism to promote valve stem centering on the diaphragm at the cost of forfeiting the adjustability feature discussed above in connection with the Edstrom patent. This valve, like that disclosed in the Edstrom patent, also employs a resilient elastomeric shield at the distal end of the valve which corresponds to the shield of the Cross patent but which is not subject to the corrosion and sticking problems discussed above with respect to the Cross patent. However, due to the arrangement of the shield, water may flow through spaces in the valve where contamination can accumulate.

OBJECTS AND SUMMARY OF THE INVENTION

It is therefore an object of the invention to provide an animal watering valve employing an elastomeric diaphragm which provides improved control of the forces applied to the valve stem head.

In accordance with a first aspect of the invention, this object is achieved by providing an animal watering valve which includes a housing, an elastomeric diaphragm, and a valve stem. The housing has a longitudinal bore formed therein, has an upstream inlet and a downstream outlet, and includes a valve cap and a valve seat disposed in axial alignment with one another. The elastomeric diaphragm includes (1) a perforated web portion having apertures formed therethrough, and (2) a cylindrical peripheral portion having a first end extending axially downstream from the web portion and being clamped between the valve seat and the valve cap. The peripheral portion defines a support from which the web portion can stretch. The valve stem is located in the bore and extends from the diaphragm toward the outlet. The valve stem is laterally deflectable against the web portion of the diaphragm to permit fluid flow through the apertures of the diaphragm and out of the valve.

Another object of the invention is to provide an animal watering valve which requires reduced actuating forces to deflect a valve stem thereof and at the same time applies increased return forces to the valve stem.

Yet another object of the invention is to provide an animal watering valve which has a resilient diaphragm and a valve stem and which present improved centering features.

In accordance with another aspect of the invention, these objects are achieved by providing an animal watering valve including a housing in which is disposed a specially designed diaphragm and valve stem. The housing has a longitudinal bore formed therein, an upstream inlet and a downstream outlet, and includes a valve cap and a valve seat disposed in axial alignment with one another. The elastomeric diaphragm is located between the valve cap and the valve seat, has apertures formed therethrough, and has a recess formed in a downstream surface thereof. The valve stem is located in the bore and extends from the diaphragm toward the outlet. The valve stem has (1) a domed head presenting a convex surface extending into the recess in the downstream surface of the diaphragm, and (2) a taft which extends downstream through the bore from the head, which is laterally deflectable with respect to the housing and which, upon deflection, shifts the head against the diaphragm to permit fluid flow through the apertures in the diaphragm and out of the valve.

Still another object of the invention is to provide an animal watering valve having an improved shield for preventing bedding and other debris from lodging the valve in its open position.

In accordance with another aspect of the invention, this object is achieved by providing an animal watering valve including a housing which has a longitudinal bore formed therein, which has an upstream inlet and a downstream outlet, and which includes a valve seat and a valve guard. A valve return element is located in the bore adjacent the valve seat, and a valve stem is located in the bore and extends from the valve return element toward the outlet. The valve stem has a head engaging a downstream surface of the valve return element, and a tail extending downstream through the bore from the head into the valve guard, wherein the tail is laterally deflectable with respect to the housing and, upon deflection, shifts the head against the valve return element to permit fluid flow through the valve. An elastomeric shield is clamped between the valve seat and the valve guard. The shield receives the tail of the valve stem and resiliently deforms upon lateral deflection of the valve stem. The shield includes a cylindrical body portion, a flange extending radially outwardly from an upstream end of the body portion and being clamped between the valve seat and the valve guard, and a membrane covering a downstream end of the body portion and having a central aperture formed therethrough for the passage of the tail of the valve stem.

Yet another object of the invention is to provide an animal watering valve of the type discussed above the flow rate through which can be adjusted without otherwise affecting the operation of the valve.

Yet another object of the invention is to provide an improved method of adjusting the flow rate through an animal watering valve.

In accordance with yet another aspect of the invention, these objects are achieved by providing an animal watering valve having at least some of the characteristics discussed above and in which the diaphragm imposes return forces on the valve stem; the "O" ring is compressed by the valve stem by an amount which is dependent upon the return forces imposed by the diaphragm and rebounds upon valve actuation by a corresponding amount; the valve cap is axially movable on the valve seat; and the magnitude of the return forces imposed on the valve stem by the diaphragm and thus the degree of compression of the ring and a fluid flow rate through the valve upon valve actuation are adjustable by adjusting the position of the valve cap relative to the valve seat.

Still another object of the invention is to provide an improved animal watering system the valves of which exhibit at least some of the characteristics discussed above.

In accordance with yet another aspect of the invention, this object is achieved by providing an animal watering system including a manifold, a rack, a plurality of cages mounted on the rack, and a plurality of valves, each of which supplies water from the manifold to one of the cages. Each of the valves includes a housing, a diaphragm, and a valve stem. The housing has a longitudinal bore formed therein and an upstream inlet in fluid communication with the manifold and a downstream outlet, and includes a valve cap and a valve seat disposed in axial alignment with one another. The elastomeric diaphragm is located between the valve cap and the valve seat, has apertures formed therethrough, and has a recess formed in a downstream surface thereof. The valve stem is located in the bore, extends from the diaphragm toward the outlet, and has (a) a domed head presenting a convex surface extending into the recess in the downstream surface of the diaphragm, and (b) a tail which extends downstream through the bore from the head, which is laterally deflectable with respect to the housing and which, upon deflection, shifts the head against the diaphragm to permit fluid flow through the apertures in the diaphragm and out of the valve.

Preferably, the diaphragm includes a perforated web portion which has the apertures formed therethrough and which has the recess formed therein, and a cylindrical peripheral portion having (1) a first end extending axially downstream from the web portion and being clamped between the valve seat and the valve cap, and (2) a second end extending upstream from the web portion and engaging a shoulder of the valve cap, the peripheral portion defining a support from which the web portion can stretch.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout and in which:

FIG. 2 is an exploded perspective view of the animal watering valve of FIG. 1;

FIG. 14 is a graph plotting pressure versus actuating force;

FIG. 15 is a graph illustrating pressure versus flow rate;

FIG. 16 is a graph plotting pressure versus flow rate for various flow settings.

DETAILED DESCRIPTION OF THE PREFERRED EMBODIMENTS

1. Resume

Pursuant to the invention, an animal watering valve is provided having a diaphragm and a domed valve stem head which provide improved control of the forces applied to the domed valve stem head and which interact to reduce the actuating forces necessary to open the valve by increasing the mechanical advantage of the valve stem/diaphragm combination. The diaphragm and valve stem also interact with each other and with an associated elastomeric ring to provide improved centering of the valve stem on the diaphragm and to permit flow rates through the valve to be adjusted without adversely affecting valve operation. An elastomeric cup shaped shield may also be employed and, if provided, imparts reduced resistance to valve stem deflection and inhibits accumulation of fluid in areas which may be contaminated.

2. System Overview and Construction of First Embodiment

Figure 17:
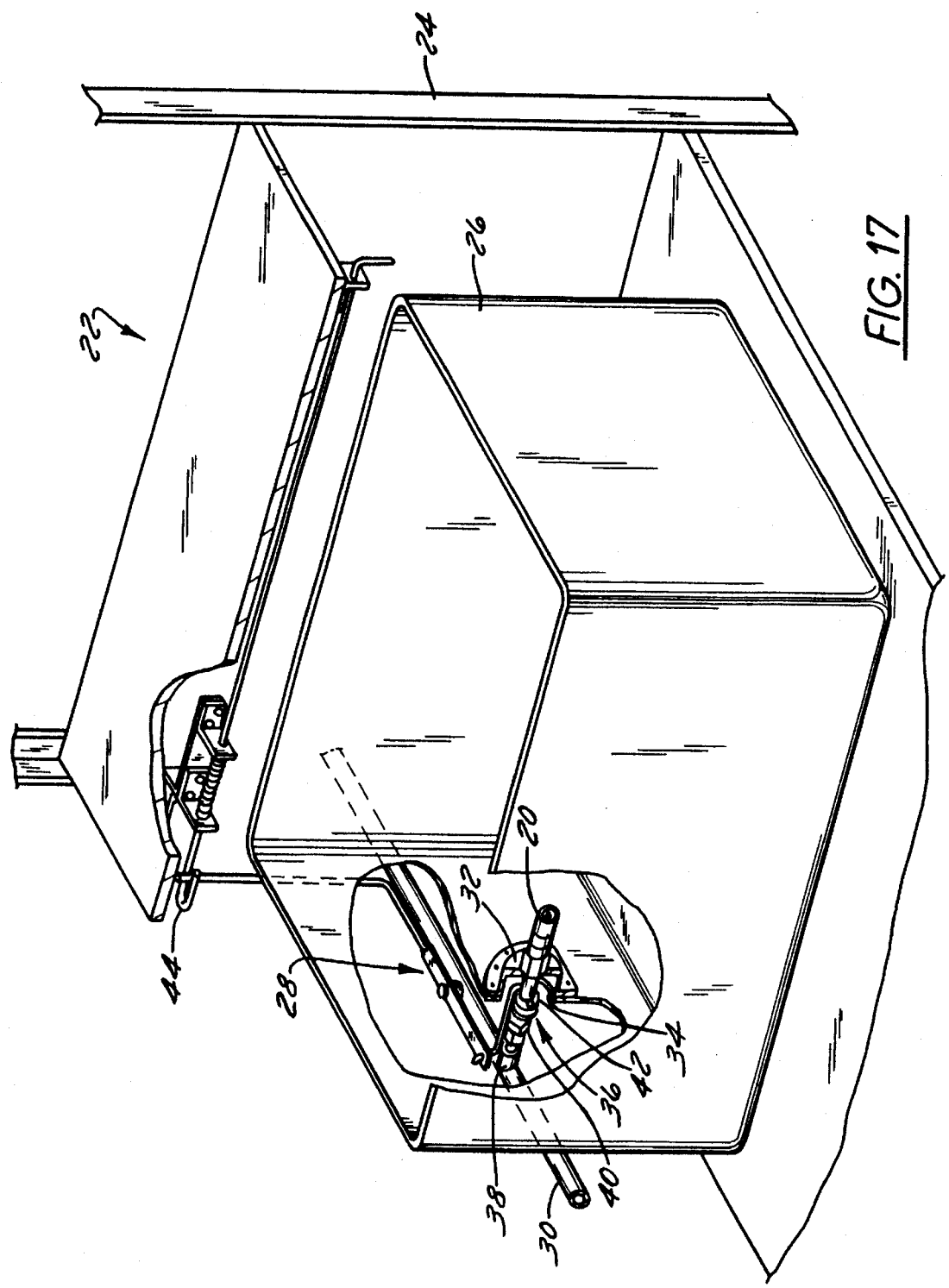
FIG. 17 is a partially cut away perspective view of a portion of an animal watering system employing the animal watering valve of FIGS. 1–9.

Referring now to FIGS. 1–9, an animal watering valve 20 is illustrated which has many applications and which is particularly useful in a cage and rack system 22 of the type illustrated in FIG. 17. Cage and rack system 22 includes a rack 24, a plurality of cages 26 mounted on the rack 24, and a watering system 28 including a manifold 30 and a plurality of the valves 20 supplying water to the interior of the cages 26 from the manifold 30. In order to minimize the risk of contamination, each of the valves 20 is preferably affixed to a grommet 32 covering an opening 34 formed in the side wall of the associated cage 26 and thus remains with the cage 26 when the cage is removed from the rack 24 for cleaning or other purposes. To permit such removal, each valve 20 is connected by a locking quick-connect coupling 36 to a nipple or feed line 38 extending from the manifold 30. The quick-connect coupling 36 includes a female fitting 40 attached the nipple or feed line 38 and a male fitting 42 extending rearwardly from the valve 20. Although not necessary for the operation of the system, a decoupler 44 is preferably provided to disengage the quick-connect coupling 36 from a remote location and could comprise a rod and linkage mechanism as illustrated or a cable mechanism.

Apart from being improved by the use of the inventive watering valve 20, the illustrated cage and rack system 22 does not form part of the present invention and, accordingly, will not be described in further detail.

Referring again to FIGS. 1–9, the animal watering valve 20 includes a housing 50 having formed therein an inlet 52, an outlet 54, and an elongated longitudinal bore 56 extending from the inlet 52 to the outlet 54. In order to facilitate assembly, the housing 50 is preferably formed from three axially aligned pieces including a valve seat 58 a valve cap 60 threaded onto an upstream end of the valve seat 58, and a valve guard 62 threaded onto a downstream end of the valve seat 58. A diaphragm 64, valve stem 66, and ring 68 are clamped between the valve seat 58 and the valve cap 60, and a shield 70 is clamped between the valve seat 58 and the valve guard 62. As explained below, the valve stem 66 and ring 68 combine to act as a valve element, and the diaphragm 64 acts, inter alia, as a valve return member.

The valve cap 60 is designed to (1) receive the male fitting 42 of the quick-connect coupling 36, (2) be mounted on the valve seat 58 for longitudinal adjustment with respect thereto, and (3) clamp the diaphragm 64, valve stem 66, and ring 68 between the valve cap 60 and the valve seat 58 without distortion of the diaphragm. To this end, the inlet end of the valve cap 60 presents a threaded connection 72 for receiving the male fitting 42 of the quick-connect coupling and also receives an O-ring 74 in a recess thereof for sealingly engaging the end of the male fitting 42. The outlet end of the valve cap 60 is formed from an internally threaded shank 76 which is connected to the valve seat 58 with an O-ring 78 formed therebetween. The shank 76 presents a chamber 80 having a peripheral wall radially spaced from a boss 88 of a valve seat 58 and having an end wall formed at the upstream or inlet end thereof from a shoulder 82 of valve cap 60.

The valve seat 58 includes a central portion 84 of increased diameter which has a width generally equal to the width of the shank 76 of the valve cap 60, an externally threaded first end portion 86 of reduced diameter which is threadedly connected to the shank 76 of the valve cap 60 and which presents the boss 88, and a second end portion 90 of reduced diameter. The boss 88 is formed by counterboring the upstream end of the first end portion 86, thereby defining an annular recess 92 which receives the ring 68. The downstream end of the second end portion 90 also presents a shoulder 94 for engaging the shield 70 as defined below.

The valve guard 62 is designed to (1) cooperate with the second end portion 90 of the valve seat 58 to clamp the shield 70 in place, and (2) to prevent an animal from perching on the end of a valve stem 66 and thus unintentionally holding the valve 20 in its actuated or open position. To this end, the valve guard 62 has a counterbore 96 formed in the upstream end thereof and a generally frustoconical recess 98 formed in the downstream end thereof. The counterbore 96 is stepped so as to present (1) an internally threaded upstream portion 100 of increased diameter which engages the external threads on the second end portion 90 of the valve seat 58 with an O-ring 102 therebetween and (2) a reduced diameter downstream portion 104 which presents a shoulder 106. The frustoconical recess 98 is designed to provide access to the valve stem 66 by an animal while inhibiting the lodging of bedding material and other debris between the valve guard 62 and the valve stem 66.

The diaphragm 64 acts as a return member for the valve element formed by the valve stem 66 and ring 68 and is designed to (1) impose controlled, uniform return forces on the valve stem 66, (2) provide better control of fluid flow through the valve 20, (3) help center the valve stem 66 in the valve, and (4) help reduce the forces required to actuate the valve 20. To this end, the diaphragm 64 is formed from a unitary elastomeric element including a central web portion 108 and a cylindrical peripheral portion 110. Peripheral portion 110 has a first end 112 extending axially downstream from the web portion 108 and a second end 114 extending axially upstream from the web portion 108. The web portion 108 is perforated and thus has apertures 116 formed therethrough for the passage of fluid, and also has a recess 118 counterbored into the downstream surface thereof for receiving a head 120 of the valve stem 66 as detailed below. The first end 112 of the peripheral portion 110 is clamped between the boss 88 of the valve seat 58 and inner periphery of the valve cap 60 to hold the diaphragm 64 in position without distorting the web portion 108, and the second end 114 engages the shoulder 82 on the valve cap 60, thereby providing a gap between the upstream surface of the web portion 108 and the shoulder 82 and thus permitting unobstructed deflection of the diaphragm 64. Peripheral portion 110 thus provides a support via which the web portion 108 can stretch without undue distortion. This absence of distortion and unobstructed deflection assure the imposition of uniform return forces on the valve stem.

The valve stem 66 is designed to present a portion of a valve element for selectively sealing against a mating portion formed by the ring 68 and to provide an animal-accessible element for opening the valve. To this end, the valve stem 66 includes (1) the head 120 which is clamped between the diaphragm 64 and the ring 68 and (2) an elongated tail 122 extending longitudinally through the bore 56 beyond the outlet 54 into the recessed end 98 of the valve shield 62. The head 120 could be flat but is preferably domed so as to present a convex surface 124 engaging a generally complementary surface defined by the recess 118 in the web portion 108 of the diaphragm 64. These mating surfaces provide improved centering of the valve stem 66 on the diaphragm 64 and also reduce the actuating forces required to actuate the valve 20 as detailed below. An upstream end 126 of the tail 122 is flared outwardly so as to engage the inner periphery of the ring 68, thereby further centering the valve stem 66 on the diaphragm 64 and the ring 68.

The ring 68 is elastomeric and could be either 0-shaped as illustrated or D-shaped so long as it (1) provides a sealing surface for the head 120 of the valve stem 66 and (2) provides an engaging surface for the upstream end 126 of the valve stem tail 122 for centering purposes.

Figure 9:
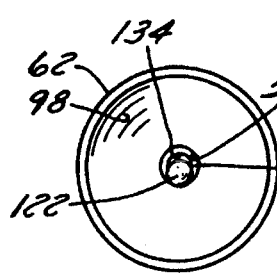
FIGS. 7–9 correspond to FIGS. 4, 5, and 6, respectively, and illustrate the animal watering valve in its actuated or open position.

The purpose of the shield 70 is to prevent bedding material or other debris from being lodged in the bore 56 between the valve stem tail 122 and the side of the bore 56 and thus to prevent the valve 20 from being stuck in its open position. The shield 70 is also designed to prevent or inhibit water from accumulating in spaces in which contamination could occur. To this end, the shield 70 is formed from a unitary elastomeric cup-shaped member including a cylindrical body 128, a flange 130 extending radially outwardly from an upstream end of the body 128, and a membrane 132 covering a downstream end of the body 128. The flange 130 is clamped between the shoulder 94 of the valve seat 58 and the shoulder 106 of the valve guard 62. The membrane 132 has a central aperture 134 formed therethrough which, upon deflection of the valve stem 66, is enlarged as illustrated in FIG. 9 to permit substantially unobstructed flow of fluid out of the valve 20. Resilient distortion of membrane 132 upon deflection of the valve stem 66 slightly biases the valve stem 66 towards its closed position. This biasing effect is, however, reduced by the cup-shape of the shield 70 for reasons discussed below.

3. Operation of First Embodiment

In use, the animal watering valve 20 normally assumes the position illustrated in FIGS. 1–6 in which the valve stem 66 extends coaxially through the bore 56 and through the center of the aperture 134 in the shield 70 such that its head 120 is maintained in sealing contact with the ring 68 under the imposition of biasing forces supplied by the diaphragm 64. The valve stem head 120 maintains a line contact on the ring 68 because the return forces imposed by the diaphragm are imposed evenly on the convex surface 124 of stem head 122. Line contact is desirable because it inhibits particles from being lodged between the stem head 122 and ring 68. Water is supplied to the inlet 52 of the housing 50 at a pressure which is typically between 3 and 8 psig but is prevented from flowing through the valve 20 by the sealing relationship between the head 120 of the valve stem 66 and the ring 68.

The valve stem head 120 of the valve stem 66 is firmly maintained in a centered position within the bore 56 at this time by cooperation between the ring 68 and the outwardly flared upstream end 126 of the tail 122 and by cooperation between the recess 118 in the web portion 108 of the diaphragm 64 and the convex surface 124 of the domed valve stem head 120. As detailed below, this centering is important to assure uniform flow rates upon valve actuation. The ring 68 is compressed by an amount which is dependent upon the clamping forces supplied by the diaphragm 64, and these clamping forces are in turn determined by the axial position of the valve cap 60 relative to the valve seat 58 as represented by the gap g in FIG. 4.

Figure 7:
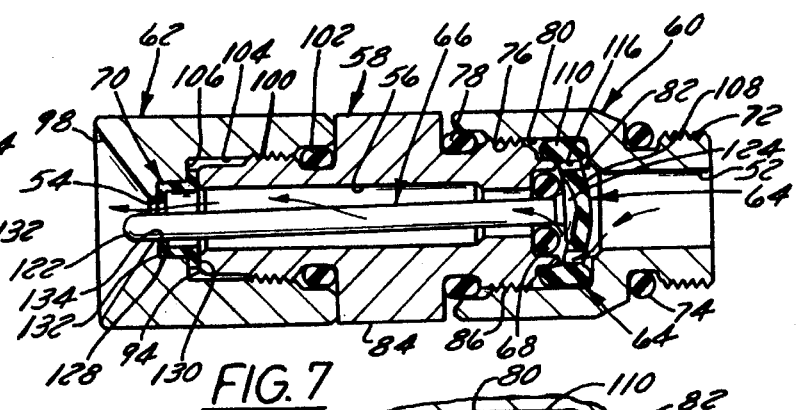
Figure 8:
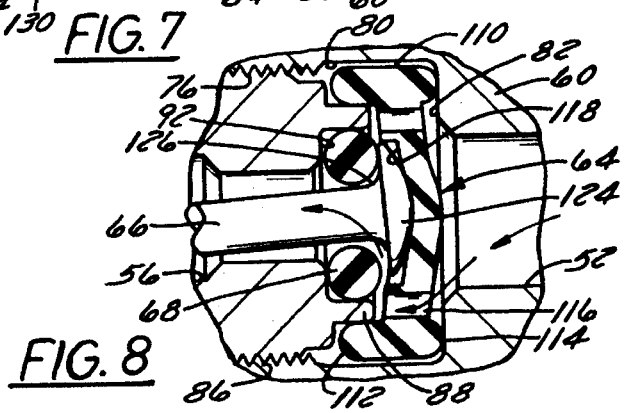

To actuate the valve 20, an animal, which may be housed in the cage 26 of FIG. 17, inserts its snout into the frusto-conical recess 98 formed in the downstream end of the valve guard 62 and deflects the tail 122 of the valve stem 66, thus pivoting the head 120 against the diaphragm and forming a gap between the underside of the head 120 and the ring 68 as illustrated in FIGS. 7–9. Water is free to flow through the apertures 116 in the diaphragm 64, through the gap, through the bore 56 in the valve housing 50, between the valve stem tail 122 and the now enlarged aperture 134 in the membrane 132 of the shield 70, and out of the outlet 54 of the valve housing 50.

Upon release of the valve stem 66, the valve 20 closes automatically primarily under the return forces imposed by the diaphragm 64 and, to a much lesser extent, under return forces imposed by the shield 70. The return forces imposed by the diaphragm 64 are applied to the convex surface 124 of the domed head 120 of the valve stem 66 and close the valve 20 by holding the flat underside of the stem head 120 against the O-ring 68 and making the above referenced line contact with the O-ring. This configuration results in the imposition of higher and more uniform closing forces than are provided by previously known resilient diaphragms.

Figure 1:
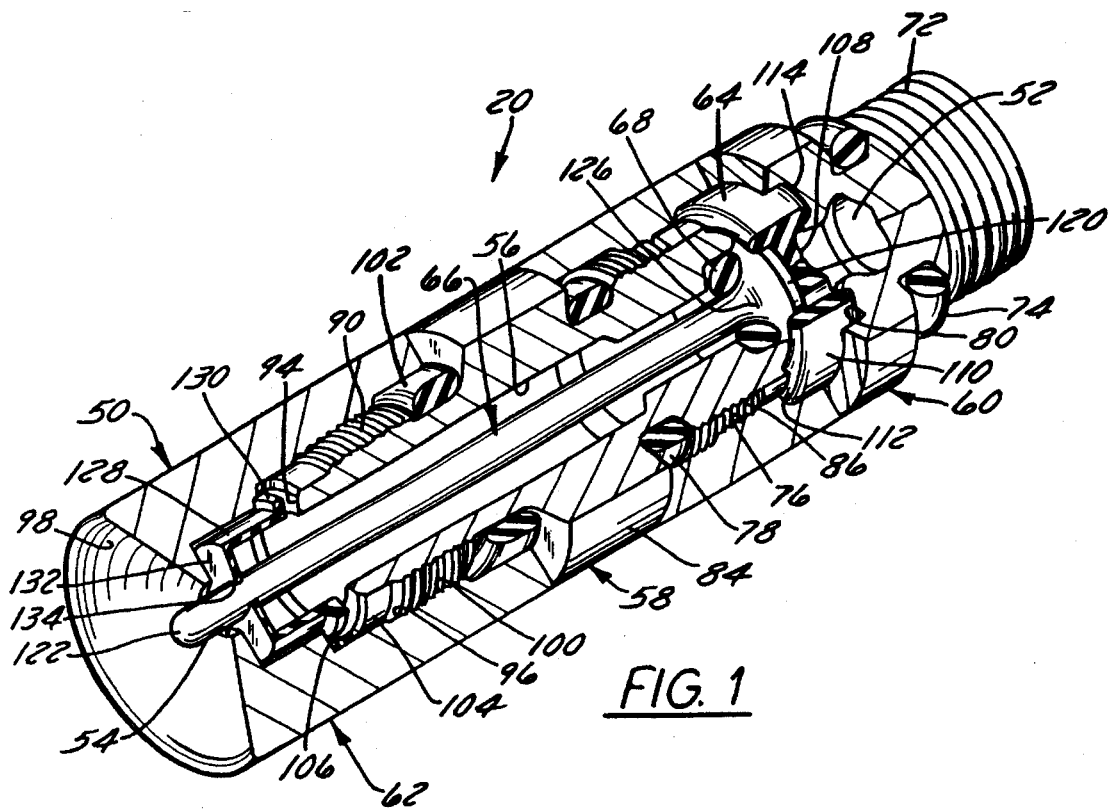
FIG. 1 is a partially cut away perspective view of an animal watering valve constructed in accordance with a first embodiment of the invention.
Figure 3A:
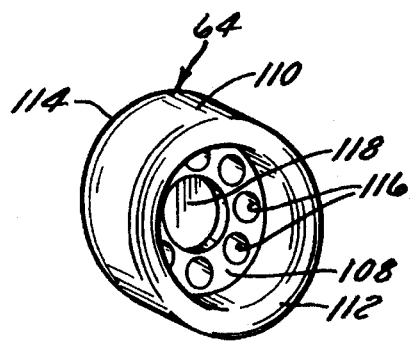
FIGS. 3 and 3A are downstream and upstream perspective views, respectively, of a diaphragm of the animal watering valve of FIGS. 1 and 2.
Figure 3:
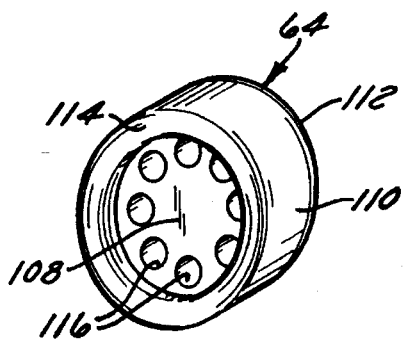
Figure 6:
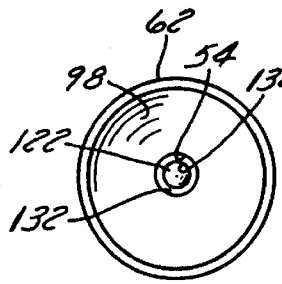
FIG. 6 is a downstream end view of the animal watering valve of FIGS. 1–5, illustrating the valve in its deactuated or closed position.
Figure 4:
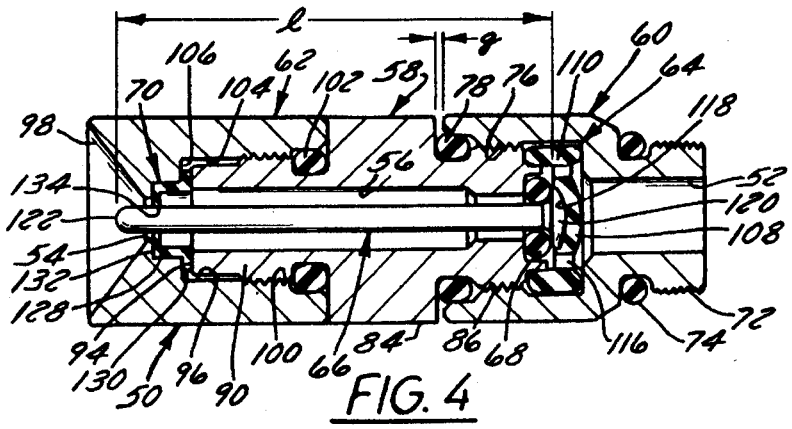
FIG. 4 is a sectional side elevation view of the animal watering valve of FIGS. 1 and 2, illustrating the valve in its deactuated or closed position.
Figure 5:
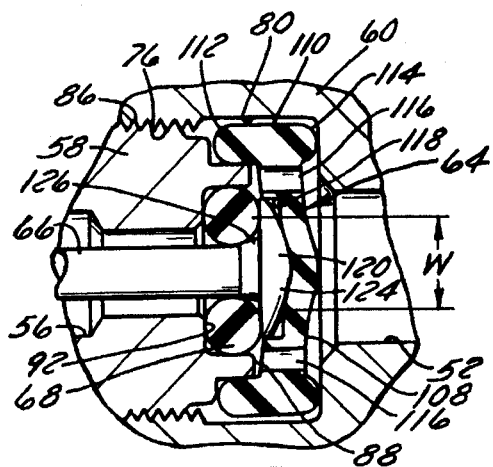
FIG. 5 is an enlarged fragmentary view of a portion of FIG. 4.
Figure 10:
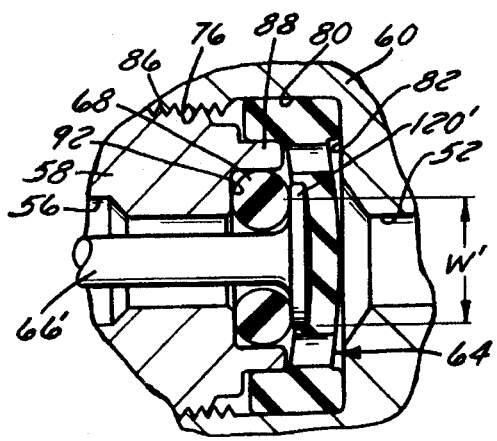
FIG. 10 is a fragmentary sectional view corresponding to FIG. 5 and illustrating an animal watering valve lacking the domed head of the valve stem of FIGS. 1–9.

The amount of force required for valve stem deflection is significantly reduced when compared to the actuating forces required for valve stems having flat heads because the valve stem 66 employing a domed head 120 has a significantly higher mechanical advantage than a valve stem having a flat head. That is, referring to FIGS. 4 and 5, the mechanical advantages l/w associated with deflecting the valve stem 66 having a domed head 120 is relatively high because the effective width w of the line of contact between the convex surface 124 of the domed valve stem head 120 and the recess 118 in the diaphragm 64 is relatively narrow. Referring to FIG. 10, the mechanical advantage l/w' of a valve stem 66' of the same length but employing a flat valve head 120' is significantly lower because the effective width w' of the line of contact of the flat valve stem head 120' on the diaphragm 64 is significantly higher. Indeed, as illustrated by the curves 136 and 138 in FIG. 14, the actuating forces required at operating pressures in the normal range of 3 to 8 psi of a valve stem employing a flat head are between 1 and 2 grams higher than for a valve stem employing a domed head. This distinction may prove important, particularly if the valves are being used to water young or otherwise weak animals which may not be able to apply sufficient actuating force to open valves having flat stem heads. For example, wealing mice weigh 8 to 20 grams and may be too weak to activate prior art valves.

It should be noted that valve stem deflection is also resisted by the shield 70. This resistance is, however, reduced by the cylindrical shape of the shield body 128 since the cylindrical side walls of the shield body 128 tend to buckle upon deflection of the valve stem 66. Less membrane distortion is thus required for stem deflection, and less resistance is offered.

FIG. 14 also illustrates that the forces required for valve actuation increase less rapidly for a valve stem employing a domed head than for a valve stem employing a flat head. That is, if the supply pressure is increased from 3 to 10 psig, the required actuating force at a particular valve setting increases from only about 2¾ grams to about 4¼ grams. The required actuating forces for a flat valve stem, on the other hand, increase upon a like pressure increase from about 4½ grams to about 6¾ grams.

Referring now to the curves 140 and 142 of FIG. 15, it should also be noted that due to the interrelationship between the stem head 120, the diaphragm 64, and the ring 68, the use of a domed valve stem head 120 also provides significantly lower flow rates at given valve settings and supply pressures than are provided by a flat stem head. This may be advantageous particularly for smaller animals which may not be able to consume water at rams higher than 15 to 25 cc per minute.

The interrelationship between the ring 68, the valve stem 66, and the diaphragm 64 also permits flow rate adjustment at given supply pressures and actually prevents valve actuation at abnormally high pressures, thus adding a safety feature. Flow rate adjustment is possible because, as discussed above, the ring 68 is compressed by the valve stem head 120 by an amount which is dependent upon the return forces imposed by the diaphragm 64. The diaphragm 64 is stretched more as the valve cap 60 is tightened onto the valve body 58, thus increasing the return forces imposed on the valve stem 66. Consequently, the amount of rebound of the ring 68 varies depending upon the position of the valve cap 60 relative to the valve seat 58. The space formed between the ring 68 and the underside of the valve stem head 120 upon actuation thus is wider with relatively wide gaps g than with relatively narrow gaps because the amount of rebound of the ring 68 decreases and flow rates thus vary directly with the thickness of the gap g. Thus, referring to the curves 144, 146, 148 and 150 of FIG. 16, the flow rate at a given supply pressure of, for example, 3 psig, can be varied from 30 to 35 cc per minute up to about 60 to 65 cc per minute depending upon the thickness of the gap g.

FIG. 16 also illustrates that the flow rate at a given flow setting increases only marginally with increases in pressure through normal pressure ranges. Thus, if the supply pressure is increased from 3 psig to 8 psig (the high end of normal operating pressure), the flow rate increases only about 5 cc/min. at low flow settings and about 10 to 15 cc/min. at high flow settings. Of course, the required actuating force increases at higher flow settings, but only slightly due to the increased mechanical advantage of the domed valve stem head as discussed above.

The valve stem head, diaphragm, and ring arrangement provides for better flow control than are provided by other known valves such as that disclosed above in the Edstrom patent. The adjustability of the valve disclosed in the Edstrom patent is due to squeezing of the diaphragm which causes the diaphragm to bulge and move and which thus causes an upward movement of the conical member, thus varying the opening between the valve member and the valve cap. In the present invention, on the other hand, when the diaphragm 64 applies a closing force, the ring 68 is compressed; and when the valve is opened, the ring 68 rebounds. This significantly reduces distortion of the diaphragm 64 and also simplifies the valve 20 since the upper conical member of the valve disclosed in the Edstrom patent is not required. Moreover, upon deflection of the valve stem 66, the central web portion 108 of the diaphragm 64 stretches freely without distortions that are caused by squeezing the outer edge of the diaphragm as disclosed in the above discussed Edstrom patent.

It can thus be seen that the inventive valve, when compared to the previously known valves, requires reduced actuating forces, applies improved closing forces, provides improved flow rate control at given supply pressure and flow settings, and can be easily and simply adjusted to provide different flow rates at a given pressure setting without adversely affecting valve operation.

4. Construction and Operation of Second Embodiment

Figure 13:
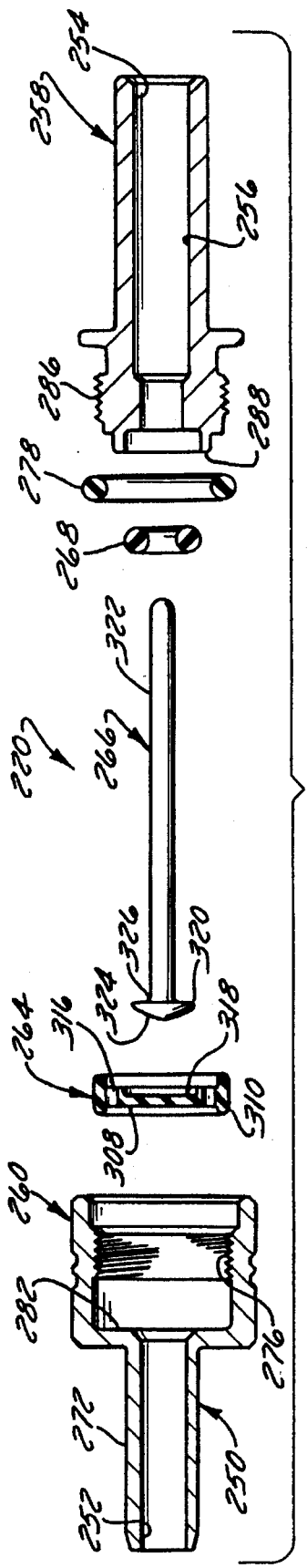
FIG. 13 is an exploded side sectional elevation view of the animal watering valve of FIGS. 11 and 12.
Figure 11:
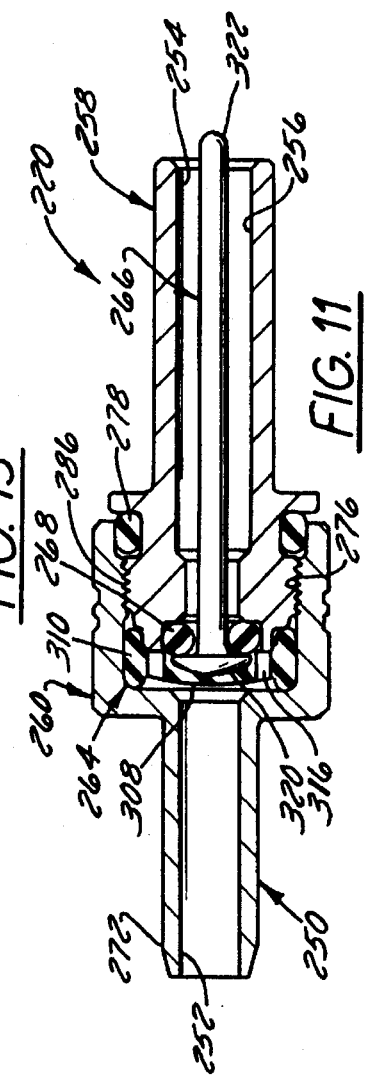
FIG. 11 is a side sectional elevation view of an animal watering valve constructed in accordance with a second embodiment of the present invention and illustrating the animal watering valve in its deactuated or closed position.
Figure 12:
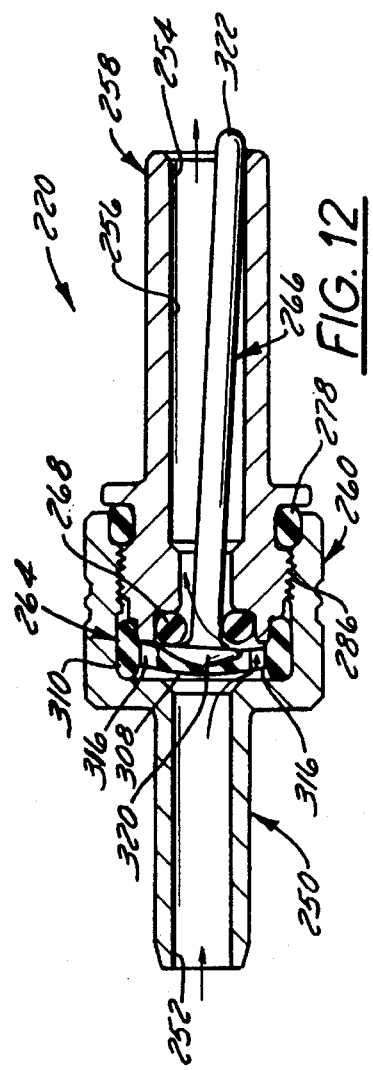
FIG. 12 is a side sectional elevation view corresponding to FIG. 11 and illustrating the animal watering valve in its actuated or open position.

The inventive valve arrangement including a diaphragm, a valve stem, and ring as discussed above could work equally as well with non-shielded valves which are often used in applications in which clogging of the valves with bedding or other debris is not a concern. Referring to FIGS. 11–13, an animal watering valve 220 is illustrated which differs from the animal watering valve 20 of the first embodiment primarily in that it lacks the shield and associated valve guard of the first embodiment. Elements of valve 220 corresponding to those of the valve 20 of the first embodiment are thus designated by the same reference numeral, incremented by 200.

Valve 220 includes a housing 250 having formed therein an inlet 252, an outlet 254, and an elongated longitudinal bore 256 extending from the inlet 252 to the outlet 254. The housing 250 is formed from two pieces including a valve seat 258 and a valve cap 260 threaded onto an upstream end of the valve seat 258 and positioned in axial alignment with the valve seat 258. A diaphragm 264, a valve stem 266, and a ring 268 are clamped between the valve seat 258 and the valve cap 260.

As in the previous embodiment, the outlet end of the valve cap 260 is formed from an internally threaded shank 276 which is connected to an externally threaded end portion 286 of valve seat 258 with an O-ring 278 formed therebetween. The shank 276 presents a chamber having a peripheral wall radially spaced from a boss 288 of a valve seat 258 and having an end wall formed at the upstream or inlet end thereof from a shoulder 282 of valve cap 260. Also as in the previous embodiment, the diaphragm 264 includes a central web portion 308 and a peripheral cylindrical portion 310, and the valve stem 266 includes a domed head 320 and an elongated tail 322 extending downstream through the bore 256 from the head 320 the web portion 308 is perforated an thus has apertures 316 formed therethrough for the passage of fluid, and also has a recess 318 counterbored into the downstream surface thereof for receiving a head 320 of the valve stem 266. An upstream end 326 of the tail 322 of the valve stem 266 is flared outwardly so as to engage the inner periphery of the ring 268, thereby further centering the valve stem 266 on the diaphragm 264 and the ring 268. The valve 220 is operated by deflection of the valve stem 266 in an identical manner to the valve of the first embodiment with the attendant improved control and operational features and with the attendant adjustability features.

The valve 220 of FIGS. 11–13 differs from the valve of FIGS. 1–9 primarily in the following respects. First, the valve shield and associated guard of the first embodiment are eliminated, and the valve seat 258 is lengthened considerably such that the end of the valve stem tail 322 extends just beyond the downstream or second end of the valve seat 258 so as to provide access by the animal. In addition, since the valve shield is eliminated, resistance to valve stem deflection and the accompanying return forces applied by the shield are eliminated. Finally, the threaded fitting on the valve cap 260 is eliminated in favor of a friction fitting 272, illustrating that the inventive animal watering valve could be used with virtually any conventional fitting.

Of course, many changes and modifications could be made to the present invention without departing from the spirit thereof, and the scope of such changes will become apparent from a reading of the appended claims.

I claim:

1. An animal watering valve comprising:
    A. a housing having a longitudinal bore formed therein and having an upstream inlet and a downstream outlet, said housing including a valve cap and a valve seat disposed in axial alignment with one another;
    B. an elastomeric diaphragm which includes
        (1) a perforated web portion having apertures formed therethrough, and
        (2) a cylindrical peripheral portion having a first end extending axially downstream from said web portion and being clamped between said valve seat and said valve cap, said peripheral portion defining a support from which said web portion can stretch; and
    C. a valve stem located in said bore and extending from said diaphragm toward said outlet, said valve stem being laterally deflectable against said web portion of said diaphragm to permit fluid flow through said apertures of said diaphragm and out of said valve.

2. An animal watering valve as defined in claim 1, wherein said valve stem has a domed head presenting a convex surface which engages a downstream surface of said web portion of said diaphragm.

3. An animal watering valve as defined in claim 1, wherein said diaphragm has a central recess formed therein which receives a head of said valve stem, thus centering said valve stem in said bore.

4. An animal watering valve as defined in claim 1, wherein said first end of said peripheral portion of said diaphragm is clamped between a boss of said valve seat and an inner periphery of said valve cap.

5. An animal watering valve as defined in claim 1, wherein said peripheral portion of said diaphragm has a second end extending upstream from said web portion and engaging a shoulder of said valve cap.

6. An animal watering valve as defined in claim 1, further comprising an elastomeric ring disposed between a head of said valve stem and a shoulder of said valve seat, wherein
    (1) said diaphragm imposes return forces on said head of said valve stem,
    (2) said ring is compressed by said valve stem by an amount which is dependent upon said return forces imposed by said diaphragm and rebounds upon valve actuation by a corresponding amount,
    (3) said valve cap is axially movable on said valve seat, and wherein
    (4) the magnitude of said return forces imposed on said valve stem by said diaphragm and thus the degree of compression of said ring and a fluid flow rate through said valve upon valve actuation are adjustable by adjusting the position of said valve cap relative to said valve seat.

7. An animal watering valve as defined in claim 1, wherein said valve housing further comprises a valve guard disposed downstream of and coaxial with said valve seat, and wherein said valve stem includes a tail extending through said bore into said valve guard, and further comprising an elastomeric shield clamped between said valve seat and said valve guard, said shield receiving said tail of said valve stem and resiliently deforming upon lateral deflection of said valve stem.

8. An animal watering valve as defined in claim 7, wherein said shield comprises
    A. a cylindrical body portion,
    B. a flange extending radially outwardly from an upstream end of said body portion and being clamped between said valve seat and said valve guard, and
    C. a membrane covering a downstream end of said body portion and having a central aperture formed therethrough for the passage of said tail of said valve stem.

9. An animal watering valve as defined in claim 1, wherein said valve stem has a tail extending downstream from said diaphragm and terminating at a distal end recessed within said housing by a distance preventing unintentional deflection of said valve stem by an animal but providing access to said valve stem by the animal.

10. An animal watering valve comprising:
    A. a housing having a longitudinal bore formed therein and having an upstream inlet and a downstream outlet, said housing including a valve cap and a valve seat disposed in axial alignment with one another;
    B. an elastomeric diaphragm which is located between said valve cap and said valve seat, which has apertures formed therethrough, and which has a recess formed in a downstream surface thereof; and
    C. a valve stem located in said bore and extending from said diaphragm toward said outlet, said valve stem having (1) a domed head presenting a convex surface extending into said recess in said downstream surface of said diaphragm, and (2) a tail which extends downstream from said head through said bore, which is laterally deflectable with respect to said housing and which, upon deflection, pivots said head against said diaphragm to permit fluid flow through said apertures in said diaphragm and out of said valve.

11. An animal watering valve as defined in claim 10, wherein a portion of said recess in said diaphragm has a shape generally complimenting that of said domed head of said valve stem.

12. An animal watering valve as defined in claim 10, further comprising an elastomeric ring disposed between a downstream surface of said head of said valve stem and said valve seat, and wherein an upstream end of said tail of said valve stem extends through said ring and is tapered outwardly to center said valve stem in said ring.

13. An animal watering valve as defined in claim 10, wherein said diaphragm includes
    (1) a perforated web portion which has said apertures formed therethrough and which has said recess formed therein, and (2) a cylindrical peripheral portion having (1) a first end extending axially downstream from said web portion and being clamped between said valve seat and said valve cap, and (2) a second end extending upstream from said web portion and engaging a shoulder of said valve cap, said peripheral portion defining a support from which said web portion can stretch.

14. An animal watering valve comprising:

A. a housing having a longitudinal bore formed therein and having an upstream inlet and a downstream outlet, said housing including a valve cap and a valve seat disposed in axial alignment with one another, said valve seat presenting a boss which is spaced from an inner periphery of said valve cap;

B. a diaphragm located in said bore between said valve cap and said valve seat, said diaphragm including
  (1) a perforated web portion which has (1) apertures formed therethrough, and (2) a recess formed in a central portion of a downstream surface thereof, and
  (2) a cylindrical peripheral portion having (1) a first end extending axially downstream from said web portion and being clamped between said boss of said valve seat and said valve cap, and (2) a second end extending upstream from said web portion and engaging a shoulder of said valve cap, said peripheral portion defining a support from which said web portion can stretch; and C. a valve stem located in said bore and extending from said diaphragm towards said outlet, said valve stem having (1) a domed head presenting a convex surface extending into said recess in said downstream surface of said web portion of said diaphragm, and (2) a tail which is laterally deflectable with respect to said housing and which, upon deflection, pivots said head against said web portion of said diaphragm to permit fluid flow through said apertures in said diaphragm and out of said valve.

15. An animal watering valve comprising:

A. a housing having a longitudinal bore formed therein and having an upstream inlet and a downstream outlet, said housing including a valve seat and a valve guard;

B. a valve return element located in said bore adjacent said valve seat;

C. a valve stem located in said bore and extending from said valve return element toward said outlet, said valve stem having
  (1) a head engaging a downstream surface of said valve return element, and
  (2) a tail extending downstream from said head through said bore into said valve guard, wherein said tail is laterally deflectable with respect to said housing and, upon deflection, pivots said head against said valve return element to permit fluid flow through said valve; and D. an elastomeric shield clamped between said valve seat and said valve guard, said shield receiving said tail of said valve stem and resiliently deforming upon lateral deflection of said valve stem, said shield including
  (1) a cylindrical body portion,
  (2) a flange extending radially outwardly from an upstream end of said body portion and being clamped between said valve seat and said valve guard, and
  (3) a membrane covering a downstream end of said body portion and having a central aperture formed therethrough for the passage of said tail of said valve stem.

16. An animal watering valve as defined in claim 15, wherein said housing further comprises a valve cap which is located upstream of said valve seat and which is in axial alignment with said valve seat, wherein said valve seat presents a boss which is spaced from an inner periphery of said valve cap, wherein said valve return element comprises an elastomeric diaphragm located in said bore between said valve cap and said valve seat, said diaphragm comprising
  (A) a perforated web portion which has (1) apertures formed therethrough, and (2) a recess formed in a central portion of a downstream surface thereof, and
  (B) a cylindrical peripheral portion having (1) a first end extending axially downstream from said web portion and being clamped between said boss of said valve seat and said valve cap, and (2) a second end extending upstream from said web portion and engaging a shoulder of said valve cap, said peripheral portion defining a support from which said web portion can stretch, wherein said head of said valve stem is a domed head presenting a convex surface extending into said recess in said downstream surface of said web portion of said diaphragm, and wherein said tail of said valve stem has an upstream end which is tapered outwardly; and further comprising an elastomeric ring which is clamped between said head of said valve stem and said valve seat and which surrounds said upstream end of said valve stem so as to center said valve stem in said ring.

17. An animal watering system comprising:

A. a manifold;

B. a rack;

C. a plurality of cages mounted on said rack; and

D. a plurality of valves, each of which supplies water from said manifold to one of said cages, each of said valves including
  (1) a housing having a longitudinal bore formed therein and having an upstream inlet in fluid communication with said manifold and a downstream outlet, said housing including a valve cap and a valve seat disposed in axial alignment with one another;
  (2) an elastomeric diaphragm located between said valve cap and said valve seat, said diaphragm having apertures formed therethrough and having a recess formed in a downstream surface thereof; and
  (3) a valve stem located in said bore and extending from said diaphragm toward said outlet, said valve stem having (a) a domed head presenting a convex surface extending into said recess in said downstream surface of said diaphragm, and (b) a tail which extends downstream from said head through said bore, which is laterally deflectable with respect to said housing and which, upon deflection, pivots said head against said diaphragm to permit fluid flow through said apertures in said diaphragm and out of said valve.

18. An animal watering valve as defined in claim 17, wherein said diaphragm includes
  (1) a perforated web portion which has said apertures formed therethrough and which has said recess formed therein, and
  (2) a cylindrical peripheral portion having (1) a first end extending axially downstream from said web portion and being clamped between said valve seat and said valve cap, and (2) a second end extending upstream from said web portion and engaging a shoulder of said valve cap, said peripheral portion defining a support from which said web portion can stretch.

19. A method comprising:

A. providing a valve including
   (1) a housing,
   (2) an elastomeric diaphragm which is located in said housing, which has a recess formed in a downstream surface thereof, and which has a plurality of apertures formed therethrough, said apertures being located radially beyond an outer radial periphery of said recess,
   (3) a valve stem located in said housing and extending downstream from said diaphragm, said valve stem having a tail and a head, said head having a convex upstream surface at least partially disposed within said recess in said diaphragm and engaging said downstream surface of said diaphragm; and
   (4) an elastomeric ring which engages a downstream surface of said head of said valve stem;

B. laterally deflecting said tail of said valve stem to pivot said convex surface of said head of said valve stem against said downstream surface of said diaphragm, thereby forming a gap between said downstream surface of said head and said ring; and then C. permitting fluid flow through apertures in said apertures in said diaphragm, past said head of said valve stem, through said gap, and out of said housing.

20. A method as defined in claim 19, wherein fluid flows through said gap at a rate determined by the thickness of said gap, and further comprising varying the maximum thickness of said gap.

21. A method as defined in claim 20, wherein said housing comprises a valve seat and a valve cap which is attached to said valve seat and which is axially adjustable relative to said valve seat, and wherein said step of varying the maximum thickness of said gap comprises adjusting the position of said valve cap relative to said valve seat.

22. A method comprising:

A. providing a valve including
   (1) a housing having a valve seat and a valve cap which is attached to said valve seat and which is axially adjustable relative to said valve seat,
   (2) a perforated elastomeric diaphragm which is located in said housing between said valve cap and said valve seat,
   (3) a valve stem located in said housing and having a head which engages said diaphragm and a tail which extends downstream from said diaphragm, and
   (4) an elastomeric ring disposed between said head of said valve stem and said valve seat;

B. compressing said ring between said head of said valve stem and said valve seat by an amount determined by the magnitude of return forces imposed on said head of said valve stem by said diaphragm, said return forces being determined by a position of said valve cap relative to said valve seat;

C. laterally deflecting said tail of said valve stem, thereby pivoting said head of said valve stem against said diaphragm; then D. permitting fluid flow through a gap between said head of said valve stem and said ring at a rate determined by the thickness of said gap, wherein the maximum thickness of said gap and the maximum flow rate of fluid through said valve under a designated source pressure are determined at least in part by the amount of rebound of said ring upon deflection of said tail of said valve stem, which is in turn determined by the amount of compression of said ring; then E. varying the maximum thickness of said gap and hence the maximum flow rate of fluid through said valve under said designated source pressure by adjusting the position of said valve cap relative to said valve seat, thereby varying the return forces imposed on said head of said valve stem by said diaphragm and varying the compression of said ring and consequently varying the amount of rebound of said ring upon subsequent deflection of said tail of said valve stem; and F. clamping an axial downstream end of a cylindrical peripheral portion of said diaphragm radially between said valve seat and said valve cap.

23. A method as defined in claim 19, wherein said providing step further comprises providing a radially inner valve seat and a radially outer valve cap, and further comprising clamping an axial downstream end of a cylindrical peripheral portion of said diaphragm radially between said valve seat and said valve cap.

* * * * *